(12) United States Patent
Collins

(10) Patent No.: US 8,495,856 B2
(45) Date of Patent: Jul. 30, 2013

(54) FRONT MOUNTED ROTARY HAY RAKE

(76) Inventor: Willard Collins, Ne Albany, IN (US)

(*) Notice: Subject to any disclaimer, the term of this patent is extended or adjusted under 35 U.S.C. 154(b) by 0 days.

(21) Appl. No.: 12/227,246

(22) PCT Filed: May 14, 2007

(86) PCT No.: PCT/US2007/011542
§ 371 (c)(1),
(2), (4) Date: Sep. 30, 2009

(87) PCT Pub. No.: WO2007/133738
PCT Pub. Date: Nov. 22, 2007

(65) Prior Publication Data
US 2010/0024375 A1    Feb. 4, 2010

(51) Int. Cl.
*A01D 78/00* (2006.01)
*A01D 78/08* (2006.01)

(52) U.S. Cl.
USPC .......................................................... 56/396

(58) Field of Classification Search
USPC ......... 56/365–367, 377, 380, DIG. 21; 16/20, 16/35 D
See application file for complete search history.

(56) References Cited

U.S. PATENT DOCUMENTS

| | | |
|---|---|---|
| 2,481,948 A | 9/1949 | Pruitt |
| 2,505,852 A | 5/1950 | Budnick et al. |
| 2,583,858 A | 1/1952 | Kostolecki |
| 2,893,192 A | 7/1959 | Tallman |
| 2,975,582 A | 3/1961 | Pollard |
| 3,377,788 A | 4/1968 | Pickrell |
| 3,911,649 A | 10/1975 | Scarnato et al. |
| 4,077,189 A | 3/1978 | Hering |
| 4,115,984 A | 9/1978 | Simpson |
| 4,183,198 A | 1/1980 | Sligter |
| 4,214,428 A | 7/1980 | Caraway |
| 4,336,629 A | 6/1982 | Jarvis et al. |
| 4,349,938 A | 9/1982 | Fontana |
| 4,753,063 A * | 6/1988 | Buck ................ 56/377 |
| 4,784,195 A | 11/1988 | Eggen |
| 5,083,341 A * | 1/1992 | Milbredt et al. ........... 16/35 R |
| 5,098,252 A * | 3/1992 | Sheesley et al. ............ 414/723 |
| 5,166,189 A * | 11/1992 | Trimbo et al. .................. 514/2 |
| 5,167,048 A * | 12/1992 | Geiger et al. ............... 16/35 D |
| 5,305,590 A | 4/1994 | Peeters |
| 5,351,364 A | 10/1994 | Zun |
| 5,548,949 A | 8/1996 | Gantzer |
| 5,706,638 A * | 1/1998 | Kinder et al. ............. 56/10.2 E |
| 5,752,375 A | 5/1998 | Tonutti |
| 5,953,894 A | 9/1999 | Aron |
| 5,966,916 A * | 10/1999 | Laing ............................ 56/377 |
| 5,987,864 A | 11/1999 | Lutz |
| 6,038,844 A | 3/2000 | Peeters et al. |

(Continued)

*Primary Examiner* — Thomas B Will
*Assistant Examiner* — Joan D Misa
(74) *Attorney, Agent, or Firm* — Carrithers Law Office PLLC; David W. Carrithers

(57) ABSTRACT

A rotary type rake having a plurality of finger wheel rotary raking elements mounted on a frame and movable thereon from one to the other of a raking position to rake material on the ground into a windrow and a retracted raised traveling position. The frame is partly supported by a pair of caster wheel assemblies that are disposed in spaced apart relation with respect to one another and a distal end of the frame which connects securely to a front end loader mounted on a tractor. Oscillatory movement of the caster wheel assemblies is restrained by a brake acting on the shaft of the caster wheel assembly by which it is mounted on the frame.

14 Claims, 6 Drawing Sheets

U.S. PATENT DOCUMENTS

| | | | |
|---|---|---|---|
| 6,105,354 | A | 8/2000 | Luhn et al. |
| 6,314,710 | B1 | 11/2001 | Tonutti |
| 6,405,517 | B1 | 6/2002 | Peeters |
| 6,543,212 | B2 | 4/2003 | Tonutti |
| 6,865,775 | B2 * | 3/2005 | Ganance ............ 16/35 R |
| 6,959,531 | B2 | 11/2005 | Magnini |
| 7,313,904 | B2 | 1/2008 | Hruska |
| 7,406,745 | B2 * | 8/2008 | Chou ............ 16/35 R |
| 2002/0059790 | A1 | 5/2002 | Paulsen |
| 2005/0172602 | A1 | 8/2005 | Scott |

* cited by examiner

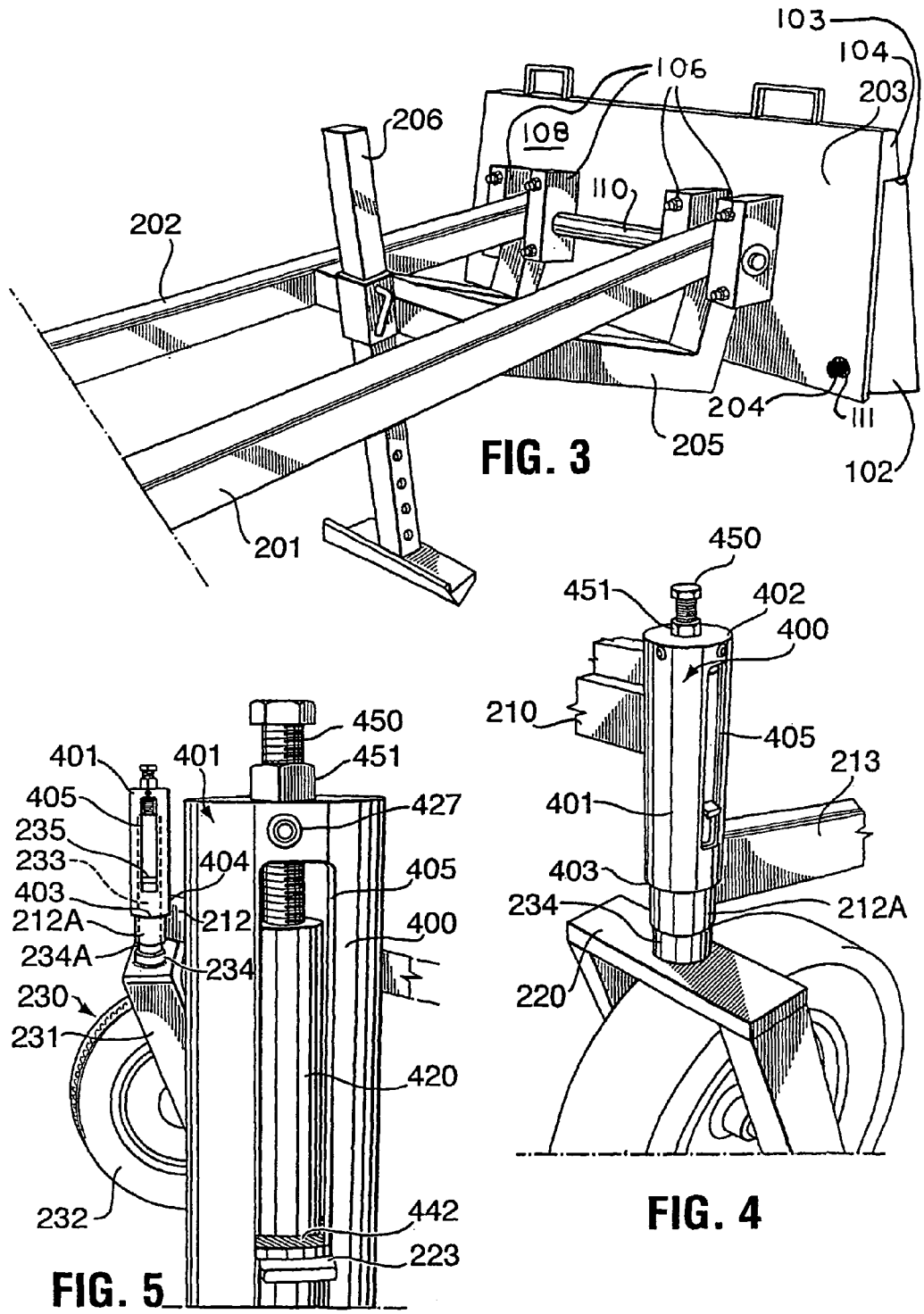

FRONT MOUNTED ROTARY HAY RAKE

RELATED APPLICATIONS

This is a national filing of PCT/US2007/011542 having an International filing date of May 14, 2007 and this application also claims priority from application Ser. No. 11/486,426 filed on Jul. 13, 2006 which claims priority from Provisional Application Ser. No. 60/800,183 filed on May 12, 2006 both of which are incorporated by reference herein in their entirety. Reference to documents made in the specification is intended to result in such patents or literature cited are expressly incorporated herein by reference, including any patents or other literature references cited within such documents as if fully set forth in this specification.

FIELD OF INVENTION

This invention relates generally to rotary hay rakes of the type pushed by a tractor unit to form a windrow that is picked up by a baler being drawn behind the tractor and more particularly to an improved hay rake, attachment thereof to the tractor unit and to an improved caster wheel assembly.

BACKGROUND OF INVENTION

Rakes, having a plurality of finger wheels mounted on a cross beam, for sweeping material into a windrow are well known and by way of example reference maybe had to the following U.S. Pat. No. 4,183,198 Issued Jan. 15, 1980 to H. Sligter, and U.S. Pat. No. 5,313,772 issued May 24, 1994 to C. Tonutt. These rakes have a cross beam supported by a pair of ground engaging wheels and a draw bar that extends forwardly from the cross beam. The draw bar can be hooked up to a tractor and towed thereby.

There are some rakes of the foregoing type that are mounted on the tractor at or proximate the front thereof. The rake maybe fixed to a front end loader mounted on the tractor. Reference maybe had to the following U.S. Pat. No. 4,753,063 issued Jun. 28, 1988 to G. Buck and U.S. Pat. No. 5,966,916 issued Oct. 19, 1999 to M Laing.

It is also known to have the rake located at the front of the vehicle so as to sweep the material on the ground into a windrow that is picked up by a machine, for example a baler, being towed behind the tractor. This combines raking and baling of raked material into a single operation. Reference may be had to the following Canadian Patent 1.066,068 issued Nov. 13, 1979 to W. C. Hering and U.S. Pat. No. 4,214,428 issued Jul. 29, 1980 to R. Caraway and U.S. Pat. No. 5,987,964 issued Nov. 23, 1999 to H. Lutz.

The front mounted rake maybe fixedly secured to the tractor whereby it changes direction simultaneously with any directional changes the tractor may make while moving. The rakes are conventionally supported by caster wheels that are in rolling engagement with the ground and any change in the direction of travel results in the caster wheel assembly pivoting about its pivotal connection to the frame of the rake such pivotal movement being about a generally vertical axis. This is the normal function of a caster wheel. There are however numerous occasions when the wheel assembly becomes unstable and will oscillate back and forth 'hunting' or 'searching' for a stable position. This movement is most undesirable as it induces vibrations resulting in abnormal wear and tear on the machine as well as on the caster wheel assembly.

Hunting movement of a caster wheel referred to in the forgoing is pronounced in instances where the caster wheels are being pushed as is the case with the rake mounted on the leading end of the tractor and pushed by the same.

SUMMARY OF THE INVENTION

Typically a wheel rake or bar rake is used to collect mowed hay by the sweeping action of a plurality of wheels or in alternate rake embodiments, bars attached to end wheels, both having tines disposed at selected positions therearound wherein the rake wheels or bars extends outwardly several feet and include a plurality of rake teeth which rake the hay into a row often rolling the hay during the process forming a twisted roll which facilities pickup by a feed section of a hay baler which compresses the hay into square or round bales. New hay balers often have an open throat design and have a feed pickup of more than three feet wide and typically as much as six feet wide so that they can accommodate large wind rows of hay. The conventional process requires the hay be cut or mowed by a tractor pulling or using a mounted mower where it is allowed to dry to a processable condition usually taking from 1 to 3 days. A tractor is then used to pull a wheel rake or bar rake to rake the hay into a windrow of desired size. Another tractor is used to pull a square or round baler to pick up and bale the windrows of hay.

The present invention provides a means to mount one or more, typically a pair of hay rakes, to a frame which utilizes a quick disconnect plate for cooperatively engaging a corresponding frame or plate of a loader mounted onto the tractor. This arrangement provides a means for quick connection and the ability to lift the rake over uneven terrain or raise the rake into a parked or transport position.

One preferred embodiment utilizes a rotary type rake having a plurality of finger wheel rotary raking elements mounted on a frame and movable thereon from one to the other of a raking position to rake material on the ground into a windrow and a retracted raised traveling position. The frame is partly supported by a pair of caster wheel assemblies that are disposed in spaced apart relation with respect to one another and a distal end of the frame which connects securely to a front end loader mounted on a tractor. Oscillatory movement of the caster wheel assemblies is restrained by a brake acting on the shaft of the caster wheel assembly by which it is mounted on the frame.

The above referenced preferred embodiment of the present invention utilizes a longitudinal frame having a removable attachment plate mounting to a tractor loader and includes a pair of side arms or booms having a plurality of raking wheels extending therefrom which can be positioned at a selected angle in front to tractor in order to accumulate and rake hay into a central windrow which can be straddled by the tractor supporting the loader and baled in a hay baler being pulled behind the same raking tractor. This arrangement eliminates a complete cycle of raking the hay then baling the hay resulting in a savings in time and fuel.

Moreover, an important feature of the present invention is a brake mechanism installed on the rake caster wheel assemblies supporting the rake frame in order to prevent the rake support wheels from wobbling.

It is anticipated that structural members and the wheel caster brake kit could be utilized as a kit to retrofit conventional trail rakes.

A principal object of the present invention is to provide a caster wheel assembly for the forgoing use with a braking mechanism that reduces the aforementioned unwanted hunting.

A further object is to provide a braking mechanism as in the forgoing and which is adjustable to selectively vary the braking force that resists the pivotal movement of the caster wheel assembly.

A further object of the present invention is to provide a finger wheel hay rake that incorporates the forgoing improved caster wheel assemblies and such a hay rake that attaches to the front of a tractor so as to be pushed by the same.

In accordance with one aspect of the present invention there is provided a rotary type rake comprising a rigid, generally horizontally disposed, frame assembly, rotary raking elements mounted on said frame and being moveable from one to the other of a raking position to rake material on the ground into a windrow and a retracted raised traveling position, a pair of caster wheel assemblies supporting a portion of said frame and disposed in spaced apart relation with respect to one another, said frame having a distal end remote from said wheel assemblies, coupling means on said distal end of said frame detachably securing the same to a front end portion of a tractor unit, and means restraining oscillatory movement of the caster wheel assemblies as the rake travels during use thereof.

In accordance with a further aspect of the present invention there is provided a rotary type rake comprising: a rigid, generally horizontally disposed, frame assembly with coupling means on a distal thereof for detachably securing the same to a front end loader mounted on a tractor, rotary raking elements mounted on said frame and being moveable from one to the other of a raking position to rake material on the ground into a windrow and a raised retracted traveling position, a pair of frame supporting caster wheel assemblies supporting said frame on the ground and being disposed in spaced apart relation with respect to one another and the distal end of said frame, said caster wheel assemblies being pivotally mounted on the frame for pivotal movement about a generally vertical axis and braking means providing a force resisting pivotal movement of the caster wheel assemblies about their respective vertical axes.

In accordance with a further aspect of the present invention there is provided a caster wheel assembly for use on an implement, said caster wheel assembly including a fork having a ground engaging wheel journal led thereon, a shaft projecting upwardly from said fork, a housing fixedly securable to a frame portion of said implement, means pivotally mounting said stem on said housing for pivotal movement about a generally vertical axis when the assembly is located in situ on the implement and braking means providing a force resisting pivotal movement of the caster wheel assembly about said generally vertical axis.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 3 is an oblique view illustrating a portion of the rake frame attached to the leading of the front end loader on the tractor;

FIG. 4 is an oblique view on a larger scale of a portion of one of the two caster wheels that supports the frame of the rake with modification thereto provided in accordance with the present invention;

FIG. 5 is a view similar to FIG. 3 but taken from a different angle and showing the upper portion of the two caster wheel assemblies with the furthest one having the internal mechanism omitted that applies a force resisting pivotal movement of the caster wheel about its vertical axis;

DESCRIPTION OF PREFERRED EMBODIMENTS

Figure 1:
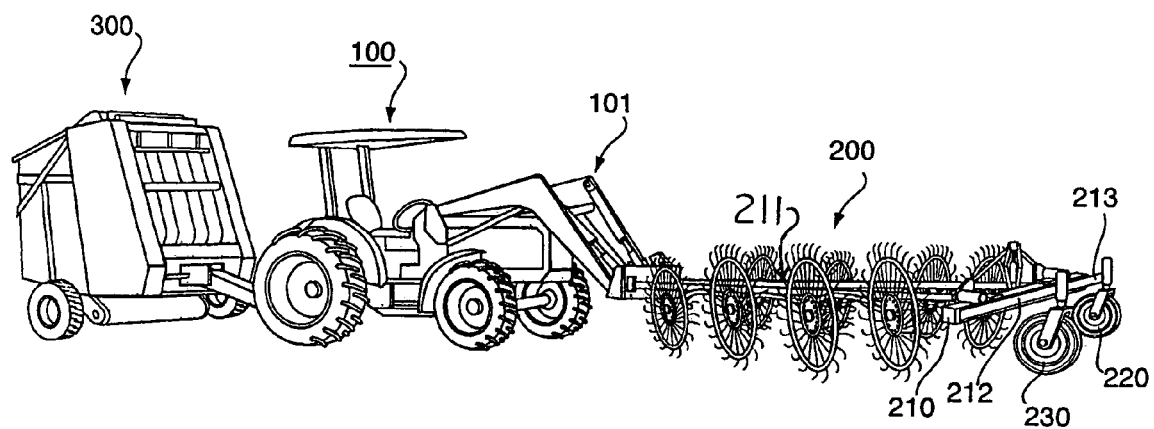
FIG. 1 is a diagrammatic oblique side view of a tractor having a hay rake mounted on the front of the tractor and a hay baler being drawn behind the tractor.

FIG. 1 diagrammatically illustrates a tractor 100 having a front end loader 101 on which there is securely attached a rotary type rake 200. A machine 300 is drawn behind the tractor to process the material raked into a windrow by the rake as the machine proceeds in the forward direction.

The rake 200 has a rigid frame that includes a pair of laterally spaced apart elongate beam 201, 202 with a plate 203 fixedly secured thereto at the distal end thereof (see FIG. 3) by a pin 207 pivotally holding the distal ends of the elongate beams 201, 202 between blocks 106 having a bore hole 109 extending therethrough with the blocks 106 affixed to the front surface 108 of the plate 203 providing for vertical movement of the rake 200 with respect to the front end loader 101. The plate is detachably and securely fastened to a bottom front portion 102 of the tractor front end loader 101 for example by a plurality of studs or bolt and nut units 204 projecting through a bore hole 111 through said plate 203, which is also detachably secured to a top front portion 103 of the tractor front end loader 101 by cooperative engagement of the top front portion 103 with a receiving channel 104 mounted on the back surface 105 of the plate 203. The trailing end of the frame is suitably reinforced by members 205 and an adjustable leg 206 is provided to support that frame end portion on the ground when the rake is not in use.

A pair of sub-frame assemblies 207, 208 are pivotally mounted on the rigid frame and each has a plurality of finger wheels 209 pivotally mounted thereon in spaced apart relation relative to one another. The sub-frames are movable by suitable power means from one position to another where in one position the finger wheels are in a lowered working position (FIG. 2) and in the other they are in a raised retracted travel position.

The rake projects forwardly from the tractor and proximate the leading end of frame members 201, 202 there is a cross beam 210. A pair of laterally spaced apart struts 212, 213 are fixedly secured to the cross beam 210 and project forwardly therefrom.

Caster wheel assemblies 220, 230 support the frame and are connected to respective struts 213, 212 by pivot means having a substantially vertical pivot axis. With the rake frame being fixedly secured to the tractor the rake changes direction simultaneously with any directional changes the tractor may make while moving and with the caster wheels disposed in rolling engagement with the ground any change in the direction of travel results in the caster wheel assemblies pivoting about the vertical axis associated therewith. This is the normal function of a caster wheel. There are however numerous occasions when the caster wheel assembly becomes unstable and will oscillate back and forth about the vertically disposed pivot axis and this oscillatory movement is herein referred to as 'hunting' or 'searching'. This hunting movement of the caster wheel assembly is most undesirable as it induces abnormal wear and tear on the equipment. Hunting movement of the caster wheel assembly referred to in the forgoing is pronounced in instances where the caster wheels are being pushed as is the case with the apparatus illustrated in the drawings.

In accordance with an aspect of the present invention each caster wheel is provided with brake means that resists pivotal movement of the caster wheel assembly about the vertical axis. The brake means maybe incorporated in new machines or retrofitted to existing equipment.

Figure 2:
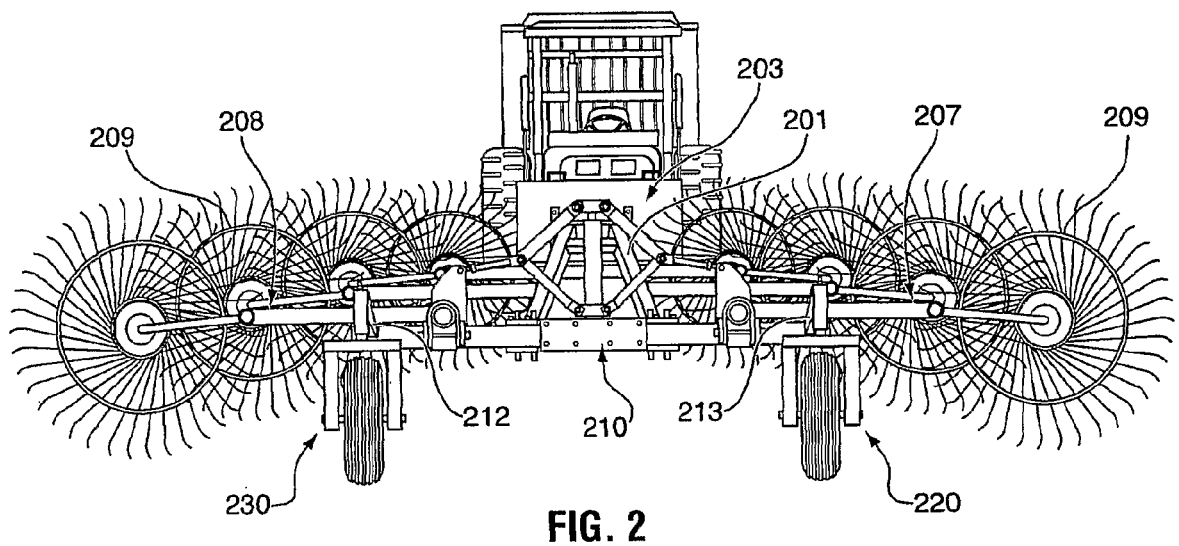
FIG. 2 is a front elevational view of the tractor and hay rake shown in FIG. 1.
Figures 6, 7:
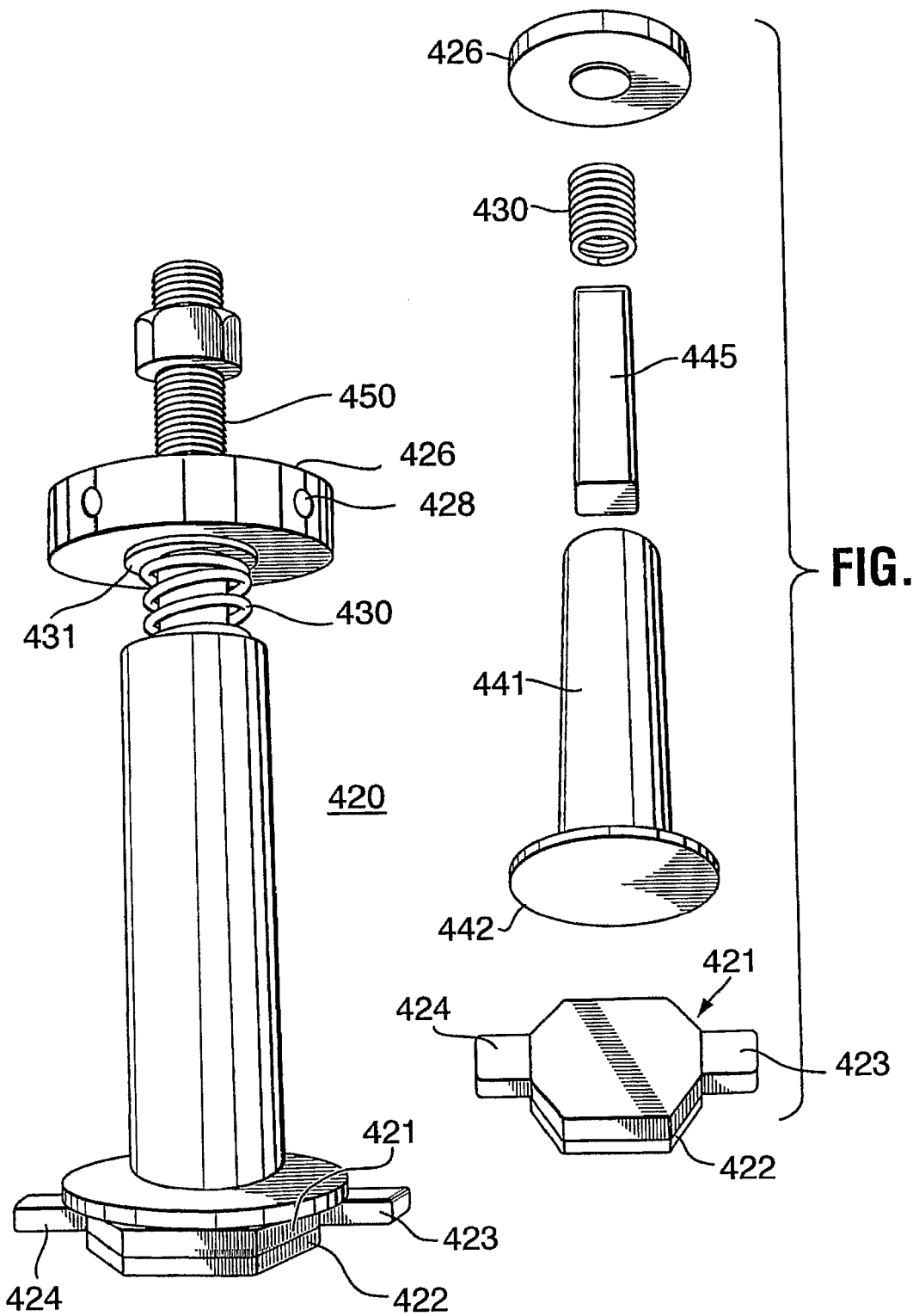
FIG. 6 is an oblique view of the internal braking mechanism omitted from the one caster wheel assembly in FIG. 4.
FIG. 7 is an exploded oblique view of the mechanism illustrated in FIG. 6.

FIGS. 1 and 2 illustrate a conventional pivotal connection of the caster wheel assembly to the forwardly projecting strut and FIGS. 4 to 7 illustrate the same but with a unit 400 mounted on the strut and projecting upwardly therefrom. The unit 400 is provided in accordance with the present invention and the purpose thereof is to apply a braking force resisting pivotal movement of the caster assembly and thereby inhibit the previously described 'hunting'.

The caster wheel assemblies 220, 230 are the same and therefor only one will be described hereinafter and in limited detail as these assemblies are known in the art.

The caster wheel assembly 230 comprises a fork 231 having a wheel 232 journalled thereon. A shaft 233 projects upwardly from the fork and is journalled by suitable bearing means in a vertically disposed tubular portion 212A on the end of the strut 212. Obviously the tubular portion 212A can be manufactured as a separate element and secured to the strut (or equivalent thereto) in any convenient manner. The shaft 233 has a spacer 234 thereon, or incorporated therein, that provides a shoulder on the upper end thereof for engagement with an end thrust bearing on the lower edge of the tubular portion 212A. The shaft extends upwardly through the tubular portion 212A and a another bearing proximate the upper end of the tubular member 212A. The shaft 233 extends on through the bearing and a short distance beyond the member 212A terminating in an upper free end 235. The caster wheel assembly 230 described to this point is conventional and maybe found on a conventional hay rake.

Referring to FIGS. 4 to 7 the unit 400 has an open ended outer sleeve 401 with respective upper and lower ends 402, 403. The inner diameter of the sleeve approximates that of the outer diameter of the vertically disposed strut tubular end portion 212A An upper portion of tubular member 212A projects into a lower end portion of the sleeve 401 and they are fixedly joined together as by welding or the like. A notch 404 in the sleeve extends upwardly from the bottom end 403 to receive therein a portion of the strut associated therewith (see FIG. 5). The wall of the sleeve has a pair of slots 405 disposed opposite one another and longitudinally along a major portion thereof.

Figure 8:
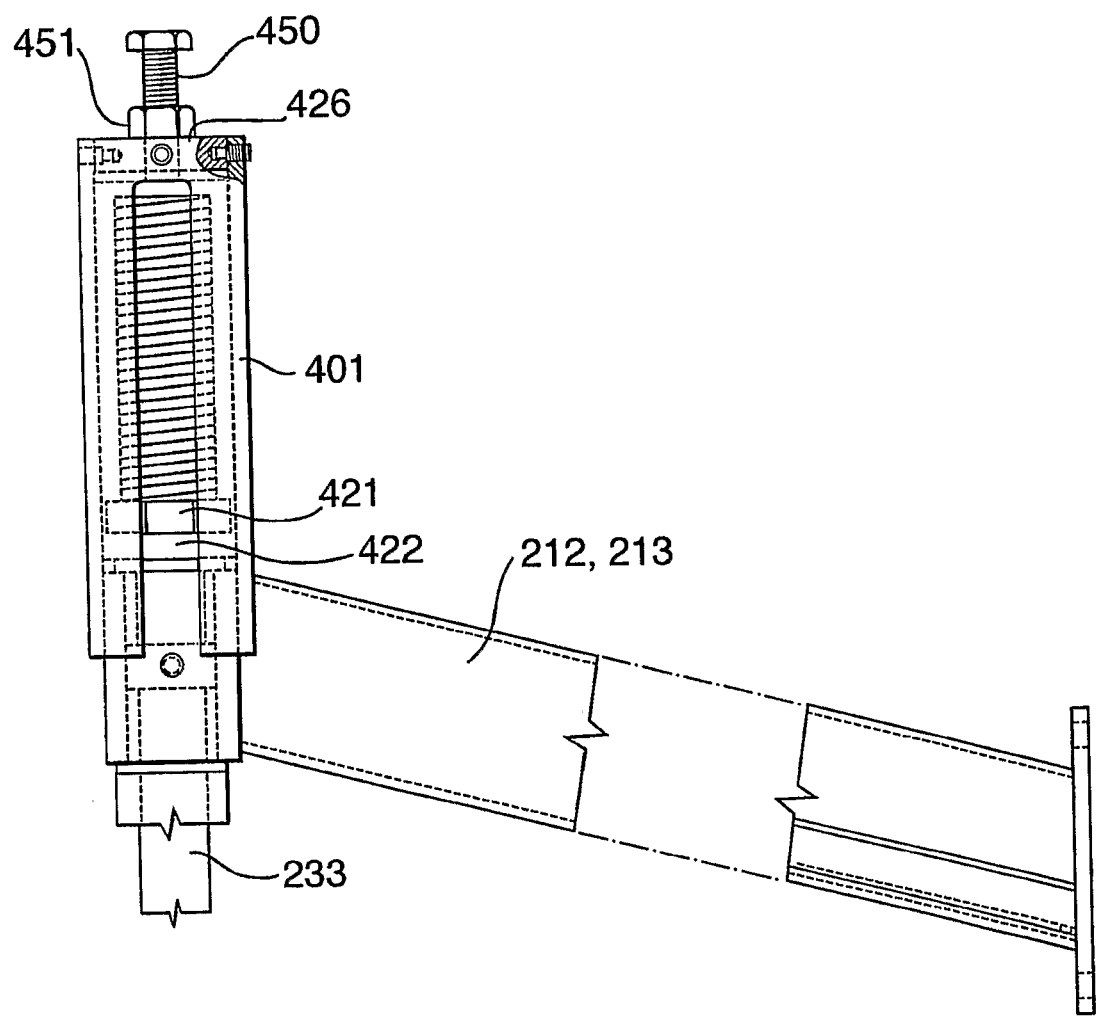
FIG. 8 is an elevational part sectional view of a modified arrangement of a mechanism that preforms the same function as the brake mechanism illustrated in FIGS. 5, 6 and 7.
Figure 9:
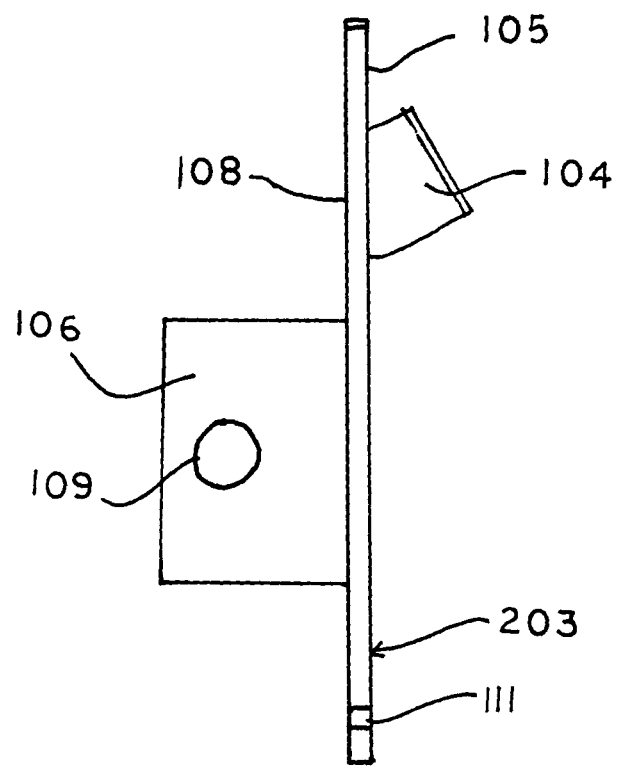
FIG. 9 is a side view of the quick attachment plate of FIG. 3 showing the channel for slidably receiving the top portion of the loader shoe.

As best illustrated in FIG. 8, a braking assembly 420 is removably located in the sleeve and includes a metal plate 421 with a brake pad 422 fixed thereto and located on the lower surface thereof. The plate 421 has lugs 423, 424 projecting from opposite sides thereof. The brake pad is disposed in the sleeve 401 in abutting relation with the upper end 235 of the shaft 233 and the lugs 423, 424 of the plate 421 to which the brake pad is attached project through a respective one of the pair of elongate slots 405. The top end of the sleeve is closed by an end cap 426 projecting into the sleeve and anchored in place by a plurality of set screws 427 threaded through the side wall of the sleeve and projecting into a respective one of a plurality of recesses 428 in a side edge of the cap.

Pressure is applied to the brake element via a compression spring 430 having one end thereof abutting a washer or plate 431 located on the under side of the end cap 426 and the other end engaging a force transfer unit. The force transfer unit includes a sleeve 441 having a flange 442 on one end thereof and which abuts against the plate 421. The sleeve 441 is open at the upper end thereof and receives therein a rod 445 that has the upper end thereof abutting against the lower end to the compression spring.

The braking force being applied to the shaft 233 can be adjustably varied by changing the pressure applied by the compression spring 430. For this purpose a bolt 450 is threaded though the end cap 426 and has a leading end engaging the washer 431. Turning the bolt changes the spring pressure and the bolt can be locked in the desired adjusted position by a lock nut 451.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A rotary type rake consisting essentially of a rigid, generally horizontally disposed, frame assembly with coupling means detachably securing the same to a front end loader mounted on a tractor, said coupling means comprising a quick disconnect plate pivotally connected for vertical motion to said frame assembly on a distal end thereof allowing said frame assembly to pivot upwards and downwards with undulating terrain, said frame assembly including stop means limiting pivoting movement of said frame assembly for raising said rake above the ground to a raised retracted traveling position, rotary raking elements mounted on said frame assembly and being moveable between a raking position to rake material on the ground into a windrow and a raised retracted traveling position, a pair of frame assembly supporting caster wheel assemblies disposed in spaced apart relation with respect to one another forward of said rotary raking elements and said distal end of the frame assembly, said caster wheel assemblies each including a caster wheel, means pivotally mounting said caster wheels on the frame assembly for pivotal movement about a generally vertical axis and brake means on each and every one of the pair of caster wheel assemblies providing a force resisting pivotal movement of each said caster wheel about the vertical axis associated therewith; and said stop means comprises at least one plate abutting frame member extending downward from at least one elongate beam of said frame assembly toward said quick disconnect plate and spaced apart therefrom a selected distance, limiting pivoting of said frame assembly with respect to said quick disconnect plate for lifting said rake to said raised retracted traveling position.

2. The rotary type rake of claim 1, wherein oscillatory movement of said caster wheel is restrained by said brake means acting on a shaft of said caster wheel mounted on said frame assembly reducing unwanted hunting of said caster wheel mounted forward of said rotary raking elements.

3. The rotary type rake of claim 1, wherein said rotary raking elements are supported by a frame assembly mounted to a quick disconnect plate mounted to said front end loader, said frame assembly including a pair of side arms or booms with said rotary raking elements comprising a plurality of raking wheels extending therefrom which can be positioned at a selected angle in front of a tractor in order to accumulate and rake hay into a central windrow which can be straddled by the tractor supporting said loader and baled in a hay baler being pulled behind the same raking tractor in a single operation.

4. The rotary type rake of claim 1, wherein said caster wheel assembly comprises an assembly including a fork having a ground engaging wheel journalled thereon, said shaft projecting upwardly from said fork, a housing fixedly securable to a frame assembly portion of said rake, means pivotally mounting said shaft on said housing for pivotal movement about said generally vertical axis when the caster wheel assembly is located in situ on said rotary type rake and said braking means providing a force resisting pivotal movement of the caster wheel assembly about said generally vertical axis.

5. The rotary type rake of claim 1, wherein said brake means including a brake pad being adjustably thrust against the entire upper surface of a pivoting shalt portion of said caster wheel assembly, said brake pad causing frictional resistance to said oscillatory movement of said shaft.

6. A rotary type rake comprising a rigid, generally horizontally disposed, frame assembly; rotary raking elements mounted on said frame assembly and being moveable between a raking position to rake material on the ground into a windrow and a retracted raised traveling position, a pair of caster wheel assemblies supporting a portion of said frame assembly and disposed in spaced apart relation with respect to one another forward of said rotary raking elements, said frame assembly having a distal end remote from said wheel assemblies, coupling means comprising a quick disconnect plate pivotally for vertical motion connected to said frame assembly on said distal end of said frame assembly detachably securing the same to a front end loader mounted on a tractor, and wherein each and every said caster wheel assembly incorporates therein means restraining oscillatory movement of a caster wheel within said caster wheel assembly as the rake travels during use thereof, said oscillatory restraining means including a brake pad and means for adjusting pressure exerted on said brake pad resulting in a selected amount of frictional resistance to said oscillatory movement of a shaft in said caster wheel assembly; and
  stop means comprising at least one plate abutting frame member extending downward from at least one elongate beam of said frame assembly toward said quick disconnect plate and spaced apart therefrom a selected distance, limiting pivoting of said frame assembly with respect to said quick disconnect plate for lifting said rake to said raised retracted traveling position.

7. The rotary type rake of claim 6, said brake pad being adjustably thrust against the entire upper surface of a shaft of said caster wheel assembly mounted on said frame assembly reducing unwanted hunting of said caster wheel mounted forward of said rotary raking elements.

8. The rotary type rake of claim 6, wherein said rotary raking elements are supported by said frame assembly mounted to a quick disconnect plate mounted to said front end loader, said frame assembly including a pair of side arms or booms extending therefrom with said rotary raking elements comprising a plurality of raking wheels, said side arms or booms capable of being positioned at a selected angle in front of a tractor in order to accumulate and rake hay into a central windrow which can be straddled by the tractor supporting said loader and baled in a hay baler being pulled behind the same raking tractor in a single operation.

9. The rotary type rake of claim 6, wherein each said caster wheel assembly comprises an assembly including a caster wheel, a fork having said caster wheel journalled thereon, said shaft projecting upwardly from said fork, a housing fixedly securable to a frame assembly portion of said rotary type rake, means pivotally mounting said shaft on said housing for pivotal movement about a generally vertical axis when the caster wheel assembly is located in situ on the rake and oscillatory restraining means providing a force resisting pivotal movement of each caster wheel about said generally vertical axis.

10. The rotary rake of claim 6, wherein said brake pad is thrust against the entire upper surface of a pivoting shaft portion of said caster wheel assembly.

11. The rotary rake of claim 6, wherein said means for adjusting pressure exerted on said brake pad includes a compression spring in cooperative engagement with said brake pad.

12. A rotary type rake comprising a rigid, generally horizontally disposed, frame assembly with coupling means for detachably securing the same to a front end loader mounted on a tractor, said coupling means including a plate pivotally connecting for vertical motion to said frame assembly on a distal end thereof allowing said frame assembly to pivot upwards and downwards with undulating terrain, said frame assembly including a stop means limiting pivoting of said frame assembly for raising said rake above the ground to a raised retracted traveling position, rotary raking elements mounted on said frame assembly and being moveable between a raking position to rake material on the ground into a windrow and said raised retracted traveling position, a pair of frame assembly supporting caster wheel assemblies disposed in spaced apart relation with respect to one another forward of said rotary raking elements and said distal end of the frame assembly, said caster wheel assemblies each including a fork having a ground engaging wheel journalled thereon, a shaft projecting upwardly from said fork, a housing fixedly securable to a frame assembly portion of said rake, means pivotally mounting said shaft on said housing for pivotal movement about a generally vertical axis when the caster wheel assembly is located in situ on the rake, and a brake means on each and every said caster wheel assembly providing a force resisting pivotal movement of each said caster wheel, said brake means including a brake pad and means for adjustably exerting pressure on said brake pad resulting in a selected amount of frictional resistance to oscillatory movement of each said caster wheel; and
  said stop means comprises
at least one plate abutting frame member extending downward from at least one elongate beam of said frame assembly toward said quick disconnect plate and spaced apart therefrom a selected distance, limiting pivoting of said frame assembly with respect to said quick disconnect plate for lifting said rake to said raised retracted traveling position.

13. The rotary type rake of claim 12, wherein oscillatory movement of said caster wheel is restrained by said brake means acting on said shaft of said caster wheel assembly mounted on said frame assembly reducing unwanted hunting of said caster wheel mounted forward of said rotary raking elements.

14. The rotary type rake of claim 12, wherein said rotary raking elements are supported by said frame assembly mounted to said quick disconnect plate mounted to said front end loader, said longitudinal frame assembly including a pair of side arms or booms with said rotary raking elements comprising a plurality of raking wheels extending therefrom which can be positioned at a selected angle in front of a tractor in order to accumulate and rake hay into a central windrow which can be straddled by the tractor supporting said loader and baled in a hay baler being pulled behind the same raking tractor in a single operation.

* * * * *